(12) United States Patent
Hinton et al.

(10) Patent No.: US 6,247,233 B1
(45) Date of Patent: Jun. 19, 2001

(54) METHOD OF ASSEMBLING A WHEEL ASSEMBLY FOR A GROUND-DRIVEN WORK MACHINE

(75) Inventors: David R. Hinton, Mount Zion; Eric A. Morr, Decatur, both of IL (US); Thomas J. Suelflow, Maplewood, MN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/589,382

(22) Filed: Jun. 7, 2000

Related U.S. Application Data

(62) Division of application No. 09/070,412, filed on Apr. 30, 1998, now Pat. No. 6,148,941.

(51) Int. Cl.[7] .................................................. B21D 53/26
(52) U.S. Cl. ............................................. 29/894.3; 29/273
(58) Field of Search ........................... 29/894.3, 894.322, 29/273

(56) References Cited

U.S. PATENT DOCUMENTS

| | | |
|---|---|---|
| 3,237,991 | 3/1966 | Hurst . |
| 3,892,300 | 7/1975 | Hapeman et al. . |
| 3,897,843 | 8/1975 | Hapeman et al. . |
| 4,057,371 | 11/1977 | Pilarczyk . |
| 4,330,045 | 5/1982 | Myers . |
| 4,799,564 | 1/1989 | Iijima et al. ........................ 180/65.5 |
| 5,083,597 | 1/1992 | FRX .................................... 152/410 |
| 5,289,905 | 3/1994 | Braschler . |

FOREIGN PATENT DOCUMENTS

| | | | |
|---|---|---|---|
| 19709588C1 | * 10/1998 | (DE) . | |
| 2767425 | * 2/1999 | (FR) . | |
| 63-141824 | 6/1998 | (JP) .................................... 180/65.5 |
| 1689125A2 | 11/1991 | (SU) .................................... 180/65.5 |

OTHER PUBLICATIONS

AR—Drawing showing wheel assembly for Caterpillar Model 793B and 793C mining trucks, admitted to show prior art.
AS—Drawing showing GDY 95 AC motorized wheel sold by GE Transport Systems, admitted to show prior art.

* cited by examiner

Primary Examiner—P. W. Echols
(74) Attorney, Agent, or Firm—John J. Cheek; Thomas L. Derry

(57) ABSTRACT

A wheel assembly for a work machine, such as a mining dump truck, comprises a rotatable wheel having inboard and outboard rims mounted thereto. The outboard rim is mounted to a segmented rim-mounting flange which is secured to the inboard side of a flange projecting from the wheel. A final drive adapter is secured to the outboard end of the wheel opposite the segmented rim mounted flange. The segmented mounting flange permits the use of a larger final drive ring gear than in known wheel assemblies. Moreover, because the mounting flange is segmented, it can be fastened to the wheel inboard of the gear reduction housing, which permits the final drive assembly to be serviced without removal of the outboard rim from the wheel. Related methods are also disclosed.

4 Claims, 5 Drawing Sheets

Fig_5_
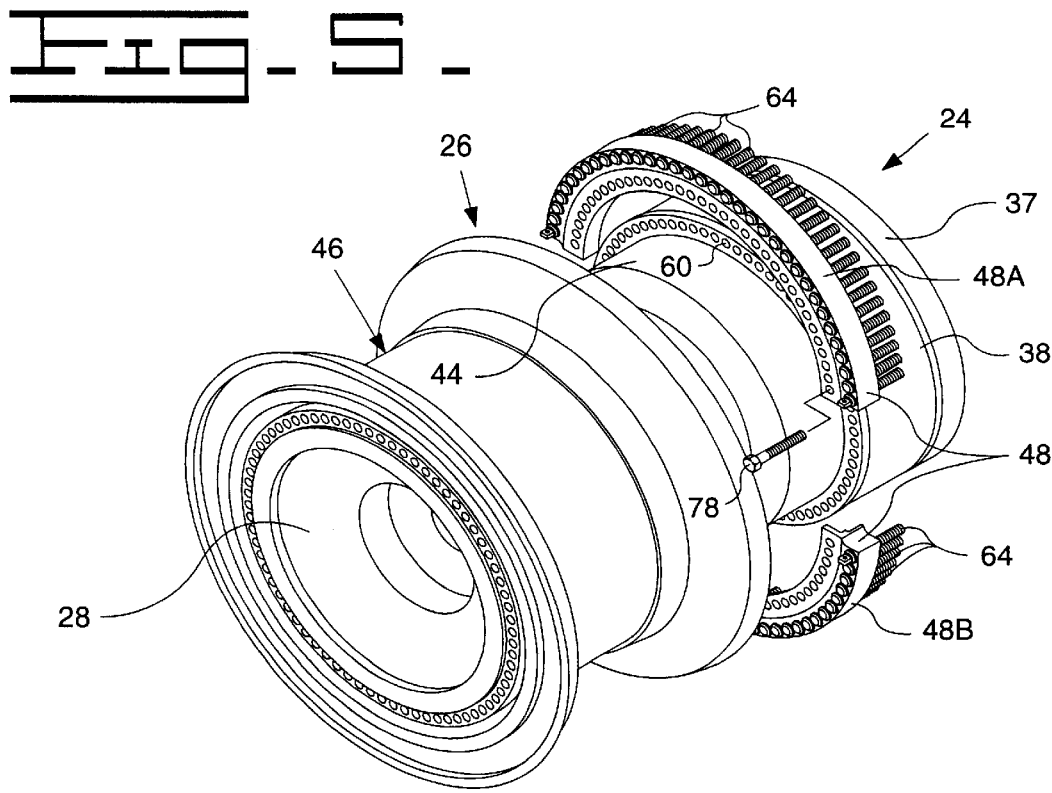
Fig_6_
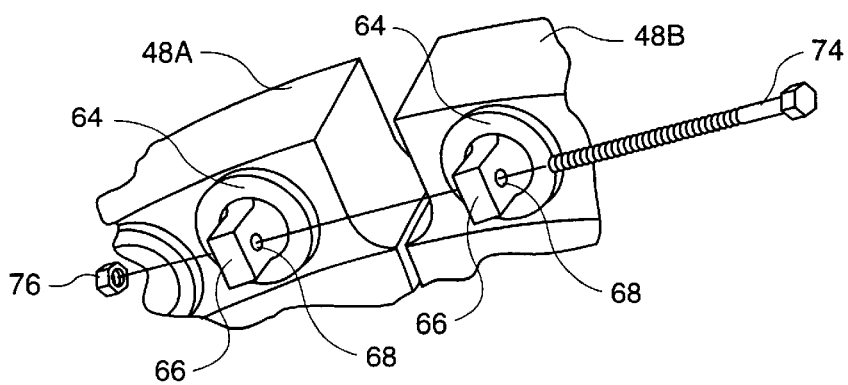

METHOD OF ASSEMBLING A WHEEL ASSEMBLY FOR A GROUND-DRIVEN WORK MACHINE

This is a divisional application of application Ser. No. 09/070,412, filed Apr. 30, 1998 now U.S. Pat. No. 6,148,941.

TECHNICAL FIELD

This invention relates to a wheel assembly for a ground-driven work machine, such as a dump truck or the like, and a method for assembling such a wheel assembly.

BACKGROUND ART

Large earth working machines, such as mining dump trucks for example, typically have at least a pair of driven wheels which are rotatably mounted upon corresponding axle housings or spindles. Each wheel is driven through a final drive reduction gear train, which is typically a double-reduction planetary arrangement, drivingly connected with a cylindrical final drive adapter that partially surround the final drive ring gear. The final drive adapter connects planetary arrangement with the wheel and may be either a separate component fastened between the planet carrier of the planetary arrangement and the wheel or may be an integral portion of the planet carrier itself. The adapter is secured to the outboard end of the wheel, and a drive axle extending through the axle housing drives the final drive adapter, and thereby the wheel, via the final drive reduction gear train. Power to drive such earth working machines is typically provided by an internal combustion engine which drives the aforementioned drive axles either through a mechanical transmission and differential arrangement or through generation of electrical power to operate electric motors coupled with the drive axles.

It is common for each wheel to carry two rims with ground-engaging tires mounted thereto, namely an inboard rim and an outboard rim. Prior known configurations are typically assembled by sliding the inboard rim over the final drive adapter and along the wheel to a rim-mounting flange projecting radially from the wheel to which the inboard wheel is fastened. An outboard rim adapter, which comprises a one-piece ring, is then slid over the final drive adapter from the outboard end thereof and fastened thereto to provide a radially-projecting outboard rim-mounting flange. The outboard rim is then slid over the final drive adapter and fastened to the outboard rim-mounting flange. Alternatively, the adapter ring may be first fastened to the outboard rim, and the rim/adapter ring combination can then be slid over the final drive adapter and fastened thereto.

Wheel and rim configurations as described above are found, for example, on Model 793C mining trucks sold by Caterpillar Inc., Peoria, Ill., and on GDY85C AC motorized wheels manufactured by GE Transportation Systems, such wheels being found on Model 930E mining trucks sold by Komatsu Haulpak, Peoria, Ill.

Although the known wheel arrangement described above is satisfactory for current machine configurations, larger machines with larger payloads are considered desirable to achieve better hauling efficiency. As machines increase in size to accommodate larger payloads, the need for more robust drive train components is paramount, which typically means the use of larger components. For example, it is desirable in trucks which use a planetary final drive to utilize as large a ring gear as reasonably possible to reduce stress on the drive train and increase component life. However, prior art constructions limit the size of the final drive ring gear because the final drive housing must be small enough for the inboard rim to slide over the final drive adapter, which partially surround the final drive ring gear and for a one-piece rim adapter ring to be fitted around the final drive adapter from the outboard end thereof as described above.

In addition, because the outboard rim in known constructions is fastened to an adapter ring mounted to the outboard end of the final drive adapter, such known constructions require removal of the outboard rim prior to removal of the final drive ring gear for repair or replacement. As a result, it is necessary to raise the outboard tire from the ground and support the machine with jacks or the like in order to remove the outboard rim and service the final drive.

The present invention is directed to overcoming one or more of the problems described above.

DISCLOSURE OF THE INVENTION

In one aspect of this invention, a wheel assembly for a work machine comprises a rotatable wheel having at least one radially-outwardly projecting flange. A first rim is mounted to the wheel for rotation therewith at a location spaced from the at least one flange. Plural flange segments are fastened to the at least one wheel flange to form a segmented radially-outwardly projecting rim-mounting flange. A second rim is mounted to the wheel for rotation therewith, the second rim having a radially-inwardly projecting flange fastened to the segmented rim-mounting flange.

In another aspect of this invention, a wheel drive assembly for use in a ground-driven work machine comprises a rotatably-fixed axle housing and a rotatable drive axle extending through the axle housing. A wheel assembly as described above is mounted for rotation about the axle housing and drivingly connected with the drive axle.

In still another aspect of this invention, a work machine adapted to be propelled across ground comprises a frame, a drive power supply mounted to the frame, and at least one wheel drive assembly as described above mounted to the frame. The drive axle of the at least one wheel drive assembly is rotatably driven by the drive power system.

In another aspect of this invention, a wheel and reduction gear assembly for use in a ground-driven work machine comprises a rotatable wheel having inboard and outboard ends, a reduction gear assembly, and a generally cylindrical reduction gear adapter drivingly connected between the reduction gear assembly and the outboard end of the wheel for rotation therewith. Inboard and outboard rims are mounted to the wheel for rotation therewith. Each of the rims has a radially-inwardly projecting mounting flange fastened to the wheel, each of the mounting flanges having an inside diameter. The outside diameter of the reduction gear adapter is substantially equal to the inside diameter of the mounting flange of the inboard rim.

In a further aspect, a wheel and reduction gear assembly for use in a ground-driven work machine comprises a rotatable wheel having inboard and outboard ends, a reduction gear assembly, and a generally cylindrical reduction gear adapter drivingly connected between the reduction gear assembly and the outboard end of the wheel for rotation therewith. An inboard rim is mounted to the wheel for rotation therewith, and a rim mounting ring is fastened to the wheel for rotation therewith at a location spaced from the inboard rim. An outboard rim is mounted to the rim mounting ring. The rim mounting ring is fastened to the wheel at a location inboard of the reduction gear adapter such that the reduction gear assembly is removable from the wheel without removal of the rim mounting ring or the outboard rim from the wheel.

In yet another aspect of this invention, a method for assembling a wheel drive assembly for a ground-driven work machine is provided. A wheel having at least one radially-outwardly projecting flange is mounted on the axle housing for rotation about the housing. A first rim is mounted to the wheel for rotation therewith. Plural flange segments are secured to the at least one wheel flange to form a segmented rim-mounting flange on the wheel. A second rim is mounted to the wheel for rotation therewith, the second wheel being fastened to the segmented rim-mounting flange.

Other features and advantages will be apparent from the following description and the accompanying drawings.

BRIEF DESCRIPTION OF THE DRAWINGS

FIG. 5 is a perspective view similar to FIGS. 3 and 4 but showing still a later stage in the assembly process.

FIG. 6 is a fragmentary, enlarged perspective view of a portion of the wheel drive assembly illustrated in FIG. 5.

BEST MODE FOR CARRYING OUT THE INVENTION

Figure 1:
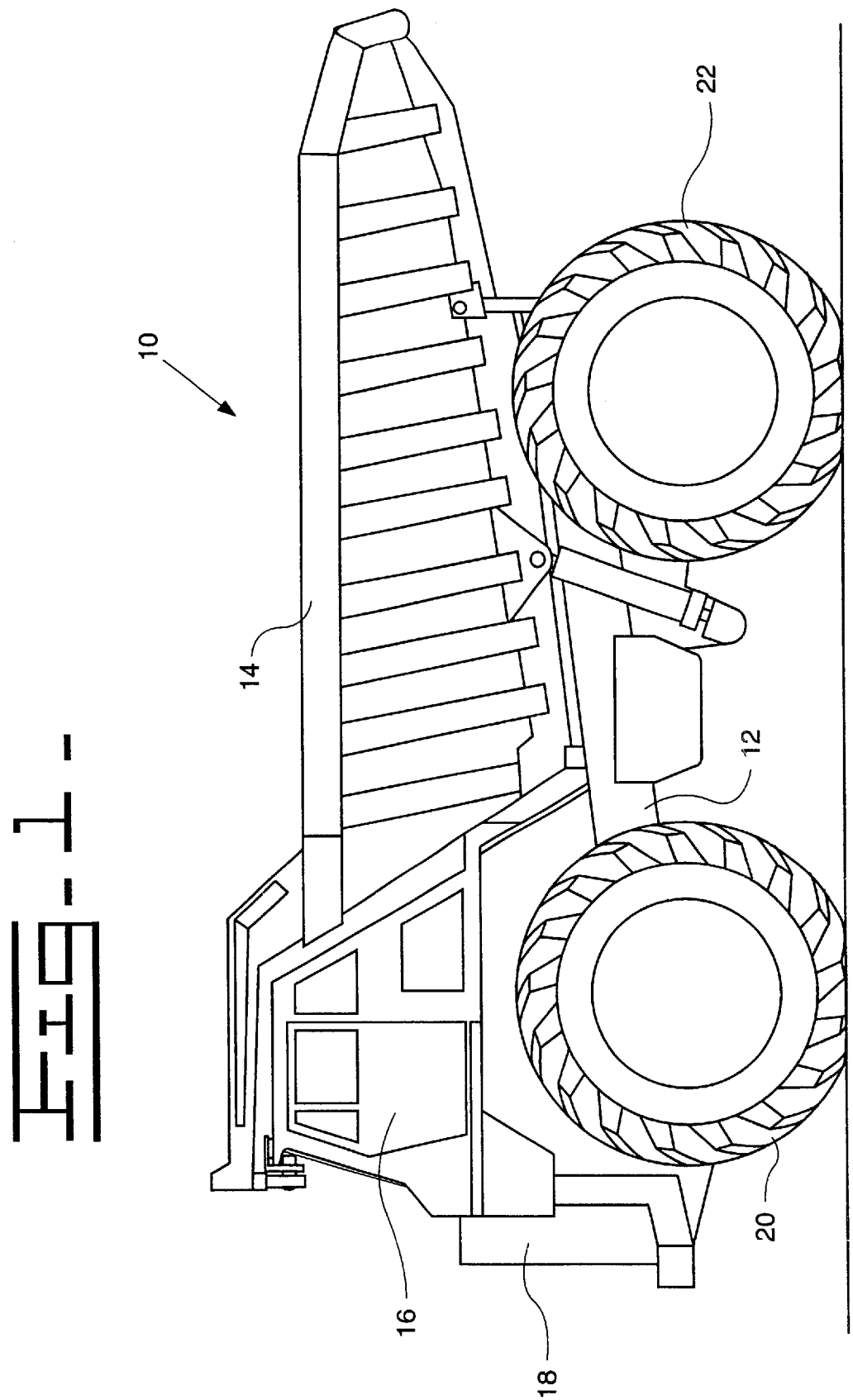
FIG. 1 is a side elevational view of a mining dump truck with which this invention may be used.

FIG. 1 illustrates an off-highway or mining truck, generally designated 10, with which this invention may be used. Although the truck 10 may be of any suitable construction, the illustrated truck 10 is a two-axle truck comprising a frame 12, a material-carrying dump body 14 pivotally mounted on the frame 12, and an operator cab 16 mounted atop an engine enclosure 18. The truck 10 is supported on the ground by front tires 20 (only one of which is shown) and rear tires 22 (only one of which is shown). As well known, one or more engines (not shown in FIG. 1) are typically mounted to the frame 12 and housed within the engine enclosure 18.

Figure 2:
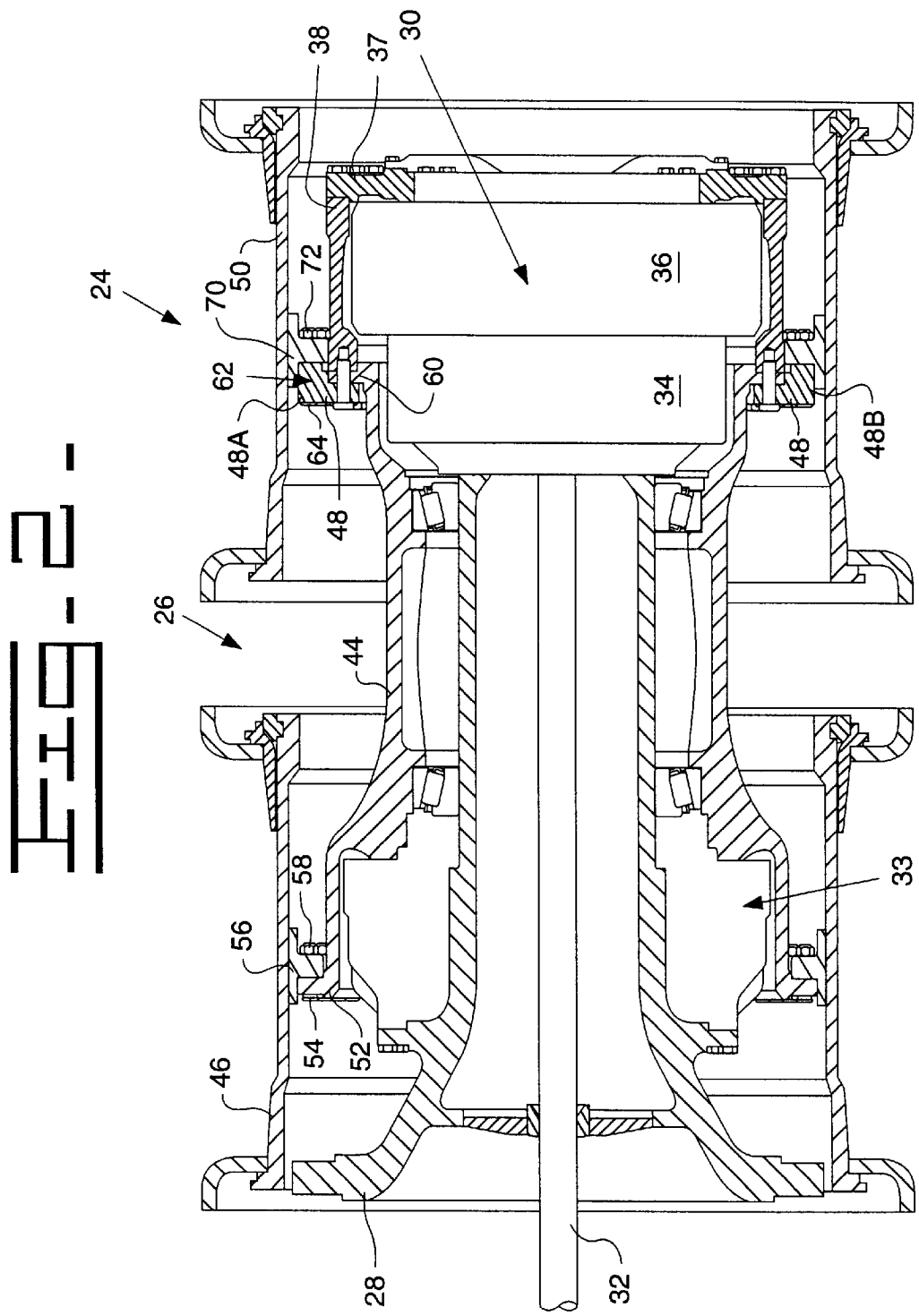
FIG. 2 is a cross-sectional view showing a fully assembled wheel drive assembly in accordance with this invention.

Referring also to FIG. 2, the rear tires 22 on each side of the truck 10 are mounted on a wheel drive assembly, generally designated 24, which includes a wheel assembly 26, a spindle or axle housing 28, a final drive assembly, shown diagrammatically at 30, and a drive axle 32. As conventional, the wheel assembly 26 is mounted for rotation about the axle housing 28 using suitable roller bearing or the like. Although not important to this invention, a conventional oil-cooled disc brake mechanism, illustrated diagrammatically at 33, is typically provided to slow or stop rotation of the wheel assembly 26 relative to the axle housing 28. The final drive assembly 30 may be a conventional double-reduction planetary final drive which is well known in the art and is, therefore, not described in significant detail herein. Generally, however, the final drive assembly 30 preferably comprises first (inboard) and second (outboard) ring gears 34, 36, several corresponding planet and sun gears (not shown), and an outer planet carrier 37. A cylindrical final drive adapter, generally designated 38, is bolted or otherwise connected between the outboard end of the wheel assembly 26 and the planet carrier 37, and is rotatably driven by the final drive assembly 30. Alternatively, the final drive adapter 38 may be defined by an integral portion of the planet carrier 37 that surround the ring gear 26, rather than a separate component between the planet carrier 37 and the wheel assembly 26. Such integral planet carrier/final drive adapter arrangements are known in the art and are not discussed in further detail herein. As apparent, rotation of the drive axle 32 is transmitted through the final drive assembly 30 to the final drive adapter 38 and thus to the wheel assembly 26 to cause rotation of the wheel assembly 26 relative to the axle housing 28.

Figure 3:
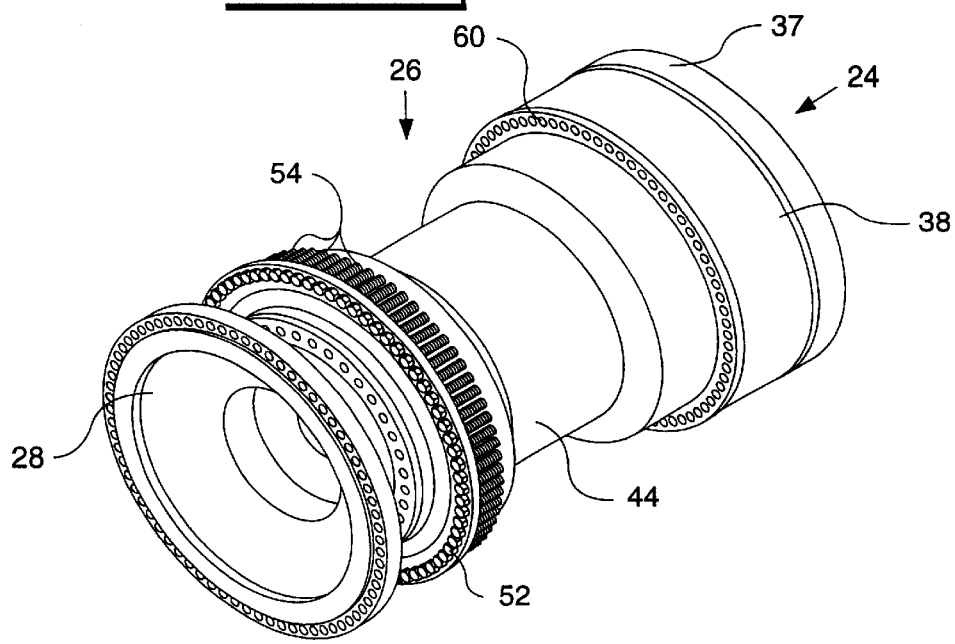
FIG. 3 is a perspective view of a partially-assembled wheel drive assembly in accordance with this invention.

With continued reference to FIG. 2, the wheel assembly 26 comprises a wheel 44, an inboard rim 46, a rim adapter ring 48, and an outboard rim 50. The wheel 44 has a radially-outwardly projecting annular flange 52 formed thereon at its inboard end which is used to mount the inboard rim 46 to the wheel 44. Referring also to FIG. 3, the flange 52 has plural studs 54 projecting therefrom toward the outboard end of the wheel 44. Each of the studs 54 has an enlarged head at one end and a shaft which extends through an aperture in the flange 52. The portion of the stud shaft which is received with the flange 52 is splined to retain the stud therein, and the projecting portion of the shaft is threaded.

Figure 4:
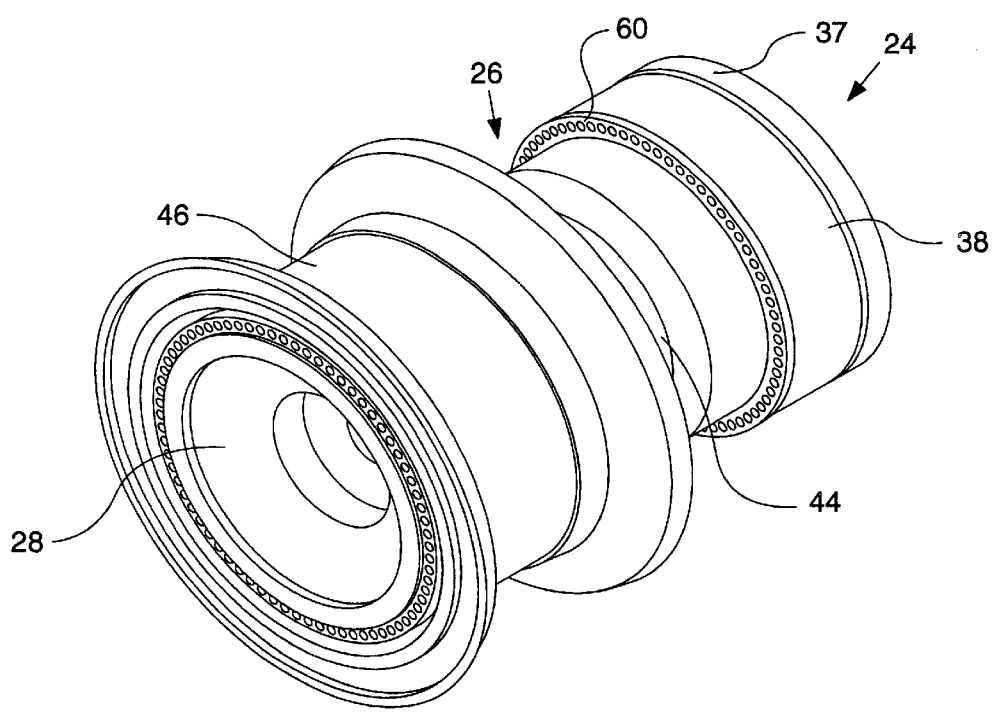
FIG. 4 is perspective view similar to FIG. 3 but showing a later stage in the process of assembling the wheel drive assembly.

The inboard rim 46 has a radially-inwardly-projecting annular mounting flange 56 which has apertures therein that align with and receive the studs 54. The inboard rim 46 is slid concentrically over the final drive adapter 38 and the wheel 44 from the outboard end thereof until the studs 54 are received within the apertures in the inboard rim flange 56. Thereafter, nuts 58 are threaded onto the studs 54 to secure the inboard rim 46 to the wheel 44, as shown in FIGS. 2 and 4. For reasons which will be discussed below and as apparent from FIG. 2, the inside diameter of the inboard rim mounting flange 56 is substantially equal to the outside diameter of the cylindrical final drive adapter 38.

Referring now to FIGS. 2 and 5, the adapter ring 48 comprises plural arcuate segments 48A and 48B which are fastened to an annular flange 60 projecting radially-outwardly at the outboard end of the wheel 44. The ring segments 48A, 48B together provide an annular outboard rim mounting flange 62 that is larger in outside diameter than the wheel 44 and the final drive adapter 38. As shown in FIG. 6, the outboard rim 50 is mounted to the wheel 44 by sliding the rim 50 concentrically over the final drive adapter 38 and fastening the rim 50 to the mounting flange 62, as will be discussed in greater detail below.

The illustrated adapter ring 48 comprises only two arcuate segment 48A, 48B which extend in substantially uninterrupted fashion substantially 360 degrees around the wheel 44. However, it will be understood that more than two ring segments may be used, and the particulars of embodiments utilizing more than two ring segments will be apparent from the following description. In addition, one skilled in the art will also recognize that adapter ring 48 need not extend around the wheel without substantial interruption.

With reference to FIGS. 2, 5 and 6, each adapter ring segment 48A, 48B is provided with mounting studs 64 which may be similar to the studs 54 described above with regard to mounting of the inboard rim 46. For reason which will be described, however, the studs 64 at confronting ends of the ring segments 48A, 48B preferably have a tab-like head 66 having an aperture 68 extending therethrough. The studs 66 are preferably installed on the ring segments 48A, 48B prior to assembly of the ring segments 48A, 48B onto the wheel 44. As apparent, the studs 66 are received within aligned apertures in a radially-inwardly projecting mounting flange 70 of the outboard rim 50, and nuts 72 are threaded onto the studs 66 to fasten the rim 50 to the adapter ring 48 and thereby the wheel 44.

The adapter ring segments 48A, 48B are assembled onto the wheel 44 by first aligning the segments 48A, 48B axially with the flange 62 as shown in FIG. 5. As shown particularly in FIG. 6, the ring segments 48A, 48B are then piloted onto the flange 62 by extending a bolt 74 through aligned apertures 68 in the studs 66 at each end of the segments 48A, 48B. A nut 76 is then threaded onto the bolt 74 and tightened to draw the ring segments 48A, 48B against the radially-outwardly-facing surface of the flange 62. Here, it will be noted that slight gap preferably remains between confronting ends of the ring segments 48A, 48B. Once the ring segments 48A, 48B are so piloted onto the flange 62, the segments 48A, 48B are then fastened to the flange 62 by bolts 78 (only one of which is shown in FIG. 5). The bolts 78 extend through the flange 62 and into the final drive adapter 38 to thereby fasten both the ring segments 48A, 48B and the final drive adapter 38 to the wheel 44. In this respect, it will be noted that the bolts 78 are preferably not threaded into the wheel flange 62, but instead simply pass through the flange 62.

Referring again to FIG. 2, the bolted joint between the bolted joint between the wheel 44, the adapter ring segments 48, and the final drive adapter 38 is located radially inwardly of the radial outer wall of the final drive adapter 38, and the outboard end of the wheel 44 is radially smaller than the final drive adapter 38 as well as the outboard ring gear 30. This configuration permits the bolted joint between the wheel 44, the adapter ring segments 48, and the final drive adapter 38 to occupy the radial space surrounding the inboard ring gear 34.

Figure 7:
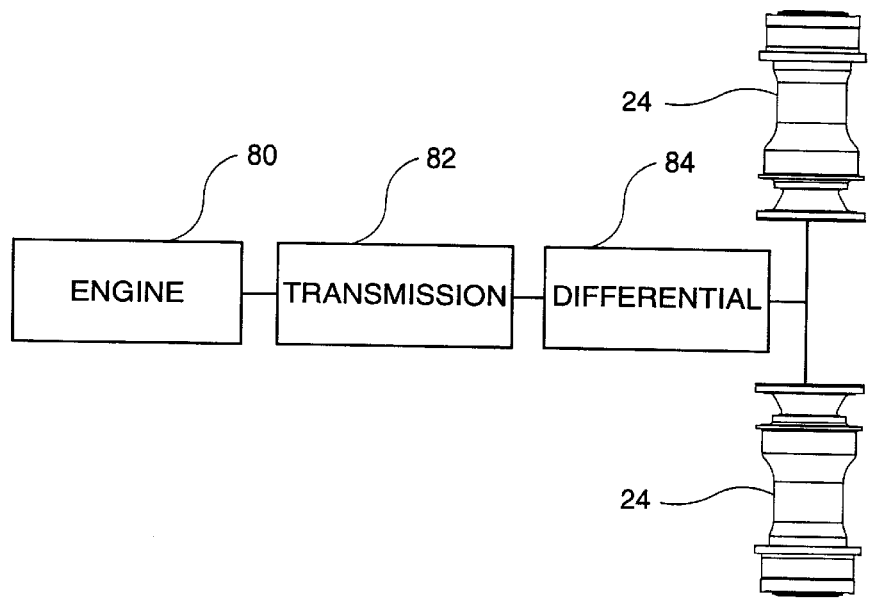
FIG. 7 is a diagrammatic representation of a mechanical-drive power train utilizing wheel drive assemblies in accordance with this invention.
Figure 8:
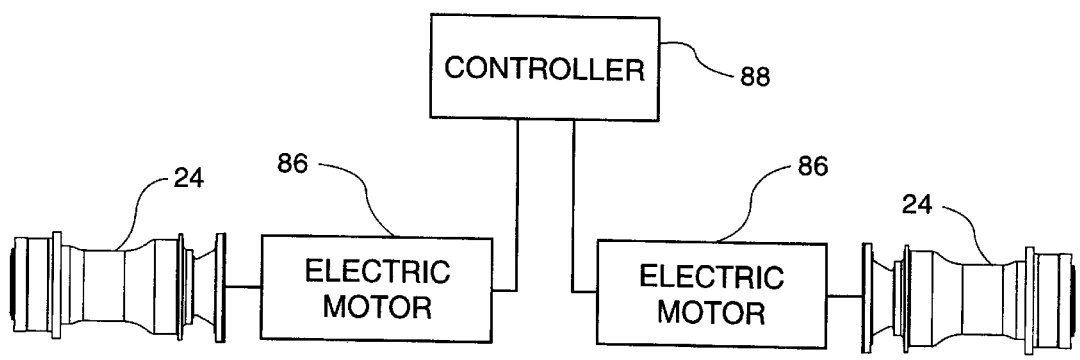
FIG. 8 is a diagrammatic representation of a portion of an electric drive power train utilizing wheel drive assemblies in accordance with this invention.

FIGS. 7 and 8 diagrammatically illustrate portions of power train arrangements which utilize wheel drive assemblies 24 as described above. FIG. 7 illustrates a so-called mechanical drive power train, which includes at least one internal combustion engine 80, a multi-gear mechanical transmission 82, a differential 84, and a pair of wheel drive assemblies 24 in accordance with this invention. The engine 80, transmission 82, and differential 84 may be of any suitable construction, may be conventional, and are, therefore, not described further herein. As well known, an output shaft (not shown) of the engine 80 is coupled with the transmission 82, and the output of the transmission 82 is coupled with the differential 84 to drive the axle shaft of each wheel drive assembly 24.

FIG. 8 illustrates a portion of a so-called electric drive power train. The axle shaft 32 of each wheel drive assembly 24 is driven by a suitable electric motor 86, and the electric motors 86 are operated by a suitable controller 88. Electric power for the motors 86 is typically provided by a generator (not shown) powered by one or more internal combustion engines (not shown) mounted to the frame 12 of the truck 10. Electric drive power trains as illustrated in FIG. 8, except for particular wheel drive assembly described herein, are well known in the art and the details thereof are not important to an understanding of the present invention. Therefore, the electric motors 86 and controller 88 are not described in further detail herein.

INDUSTRIAL APPLICABILITY

The construction described above provides several advantages over the wheel and rim constructions previously known in the art. More particularly, because the adapter ring 48 is segmented and fastened to the wheel 44 instead of the final drive adapter 38, the final drive adapter 38 may be substantially the same diameters as the inside diameter of the inboard rim 46. Thus, outboard ring gear 36 of the final drive assembly 30 may be as large as possible for a particular rim size, thereby minimizing stress on the drive train and extending the life of the final drive assembly 30 and other power train components. The configuration of the outboard end of the wheel and the bolted joint between the wheel 44, the adapter ring segments 48, and the final drive adapter 38 also contribute to the ability to use a large outboard ring gear 30.

In addition, the final drive adapter 38, except when integral with the planet carrier 37, need not be removed from the wheel 44 in order for the final drive assembly 30 (and particularly the ring gear 36) to be serviced or replaced. Therefore, the final drive assembly 30 (and particularly the ring gear 36) may be serviced or removed with the truck 10 supported on its own tires. The truck 10 need not be jacked up or otherwise supported above the ground in order to fully service the final drive assembly 30 or even remove it from the wheel assembly 24 in its entirety.

Although the presently preferred embodiments of this invention have been described, it will be understood that within the purview of the invention various changes may be made within the scope of the following claims.

What is claimed is:

1. A method for assembling a wheel drive assembly for a ground-driven work machine, said wheel drive assembly comprising an axle housing, said method comprising the steps of:

mounting a wheel on said axle housing for rotation about said housing, said wheel having at least one radially-outwardly projecting flange;

mounting a first rim to said wheel for rotation therewith;

securing plural flange segments to said at least one wheel flange to form a segmented rim-mounting flange on said wheel; and mounting a second rim to said wheel for rotation therewith, said second rim being fastened to said segmented rim-mounting flange.

2. The method of claim 1 wherein said first rim has a radially-inwardly projecting mounting flange, and wherein said first rim mounting step comprises sliding said first rim along said wheel such that said mounting flange of said first rim passes over said at least one flange projecting radially from said wheel.

3. The method of claim 2 wherein said first rim comprises an inboard rim and said second rim comprises an outboard rim.

4. The method of claim 1 wherein said wheel has inboard and outboard ends, wherein said at least one wheel flange has inboard and outboard sides, and wherein said plural flange segments are secured to the inboard side of said wheel flange.

* * * * *

UNITED STATES PATENT AND TRADEMARK OFFICE
CERTIFICATE OF CORRECTION

PATENT NO. : 6,247,233 B1
DATED : June 19, 2001
INVENTOR(S) : David R. Hinton et al.

It is certified that error appears in the above-identified patent and that said Letters Patent is hereby corrected as shown below:

<u>Title page,</u>
Item [22], after "Filed", delete "June 7, 2000", and insert -- June 2, 2000 --

Signed and Sealed this

Twenty-fifth Day of December, 2001

Attest:

*Attesting Officer*

JAMES E. ROGAN
*Director of the United States Patent and Trademark Office*